United States Patent
Lin

(10) Patent No.: US 9,042,822 B2
(45) Date of Patent: May 26, 2015

(54) COMMUNICATION DEVICE AND NEAR FIELD COMMUNICATION CIRCUIT THEREOF

(75) Inventor: Shang-I Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 43 days.

(21) Appl. No.: 13/404,016

(22) Filed: Feb. 24, 2012

(65) Prior Publication Data

US 2013/0225070 A1 Aug. 29, 2013

(51) Int. Cl.
H04B 7/00 (2006.01)
H04B 17/00 (2006.01)
H04B 5/00 (2006.01)

(52) U.S. Cl.
CPC .................... *H04B 5/0056* (2013.01)

(58) Field of Classification Search
USPC ............................. 455/41.1, 41.2, 41.3, 67.13
See application file for complete search history.

(56) References Cited

U.S. PATENT DOCUMENTS

| | | | |
|---|---|---|---|
| 7,020,164 B1* | 3/2006 | Singleton et al. | 370/480 |
| 7,387,256 B2 | 6/2008 | Zhu et al. | |
| 2005/0046521 A1* | 3/2005 | Komiya | 333/202 |
| 2005/0225437 A1* | 10/2005 | Shiotsu et al. | 340/10.51 |
| 2009/0252348 A1 | 10/2009 | Glissman | |
| 2011/0287714 A1* | 11/2011 | Wilson et al. | 455/41.1 |
| 2013/0109305 A1* | 5/2013 | Savoj et al. | 455/41.1 |

FOREIGN PATENT DOCUMENTS

| | | |
|---|---|---|
| CN | 1528004 | 9/2004 |
| CN | 102082449 | 6/2011 |

OTHER PUBLICATIONS

"Office Action of China Counterpart Application", issued on Sep. 3, 2014, p. 1-p. 8.
"Office Action of Germany Counterpart Application", issued on Feb. 28, 2013, p. 1-p. 9.

* cited by examiner

*Primary Examiner* — Ping Hsieh
*Assistant Examiner* — Xin Jia
(74) *Attorney, Agent, or Firm* — Jianq Chyun IP Office

(57) ABSTRACT

A communication device having a wireless communication system and a Near Field Communication (NFC) circuit is provided. The NFC circuit includes two pads, two ferrite beads and a NFC controller. The first pad and the second pad are coupled to a NFC antenna. The first and the second ferrite bead are respectively coupled to the first pad and the second pad. The NFC controller includes two pins. The first pin and the second pin are coupled to the first ferrite bead and the second ferrite bead, respectively. The first pin and the second pin output a differential NFC signal to be emitted by the NFC antenna. The first and the second ferrite bead allow the fundamental frequency component of the NFC signal to pass, and filter out a plurality of high-frequency components for avoiding the operating frequency of the wireless communication system from being interfered by the high-frequency components.

16 Claims, 4 Drawing Sheets

COMMUNICATION DEVICE AND NEAR FIELD COMMUNICATION CIRCUIT THEREOF

BACKGROUND

1. Technology Field

The present invention relates to a communication device, and more particularly, to a communication device having a Near Field Communication circuit capable of filtering out high-frequency harmonic waves by using a ferrite bead.

2. Description of Related Art

In our daily life, Near Field Communication (simplified as the NFC hereinafter) technology has been widely used in many fields, such as credit cards, electronic wallets, easy cards, hotel room cards or membership cards, etc. Recently, a mobile phone integrated with the NFC function has greatly increased the usage convenience. For instance, the combination of the mobile phone and the easy card allows the user to pay the transit fare for a bus ride or a subway ride by sensing the mobile phone, or the combination of the mobile phone and the electronic wallet allows the user to pay the money by sensing the mobile phone during shopping.

However, when the NFC technology is integrated into a communication device, such as a personal digital assistant (PDA) or a smart phone, the high-frequency harmonic wave generated from the fundamental frequency which is operated by the NFC technology may be overlapped with the frequency band used by the mobile phone. Therefore, the transmission quality of the mobile phone is decreased due to the signal interference caused by the fundamental frequency of the NFC technology.

SUMMARY OF THE DISCLOSURE

The present invention is directed to a NFC circuit capable of filtering out high-frequency harmonic waves generated from the NFC signal by using a ferrite bead during the signal transmission.

The present invention is directed to a NFC circuit including a first pad, a second pad, a first ferrite bead, a second ferrite bead and a NFC controller. The first pad and the second pad are coupled to a NFC antenna. The first ferrite bead is coupled to the first pad, and the second ferrite bead is coupled to the second pad. The NFC controller includes a first pin and a second pin respectively coupled to the first ferrite bead and the second ferrite bead. The first pin and the second pin output a differential NFC signal to be emitted by the NFC antenna. The first ferrite bead and the second ferrite bead allow a fundamental frequency component of the differential NFC signal to pass, and filter out a plurality of high-frequency components which are the high-frequency harmonic waves of the fundamental frequency component.

According to an embodiment of the present invention, the NFC circuit described above is used in a communication device including a wireless communication system, and at least one of the frequencies of the high-frequency components is overlapped with one of the operating frequencies of the wireless communication system.

According to an embodiment of the present invention, the structures of the first ferrite bead and the second ferrite bead are the same.

According to an embodiment of the present invention, an impedance of the first ferrite bead corresponding to the frequency of the fundamental frequency component is smaller than a first threshold, and each impedance of the first ferrite bead corresponding to each frequency of the high-frequency components is greater than a second threshold.

According to an embodiment of the present invention, the maximum direct current (DC) resistance of the first ferrite bead is smaller than or equal to a third threshold acceptable to the NFC controller.

According to an embodiment of the present invention, a rated current of the first ferrite bead is greater than an output current of the first pin, and a rated current of the second ferrite bead is greater than an output current of the second pin.

According to an embodiment of the present invention, the NFC circuit further includes an impedance matching circuit coupled among the first pin, the second pin and the NFC antenna, for providing a matched impedance between the NFC controller and the NFC antenna.

According to an embodiment of the present invention, the differential NFC signal outputted by the first pin and the second pin is a square wave. The NFC circuit further includes a waveform converting circuit coupled among the first pin, the second pin and the impedance matching circuit, and used for converting the square wave to a sinusoidal wave, wherein the frequencies of the square wave and the sinusoidal wave are as same as the frequency of the fundamental frequency component.

The present invention is further directed to a communication device including the above-described NFC circuit and wireless communication system.

In summary, a NFC circuit and a communication device including the NFC circuit are provided. The NFC circuit is capable of filtering out the high-frequency harmonic wave of the differential NFC signal by using the ferrite bead and avoiding the operating frequency of the wireless communication system from being interfered by the high-frequency harmonic wave.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
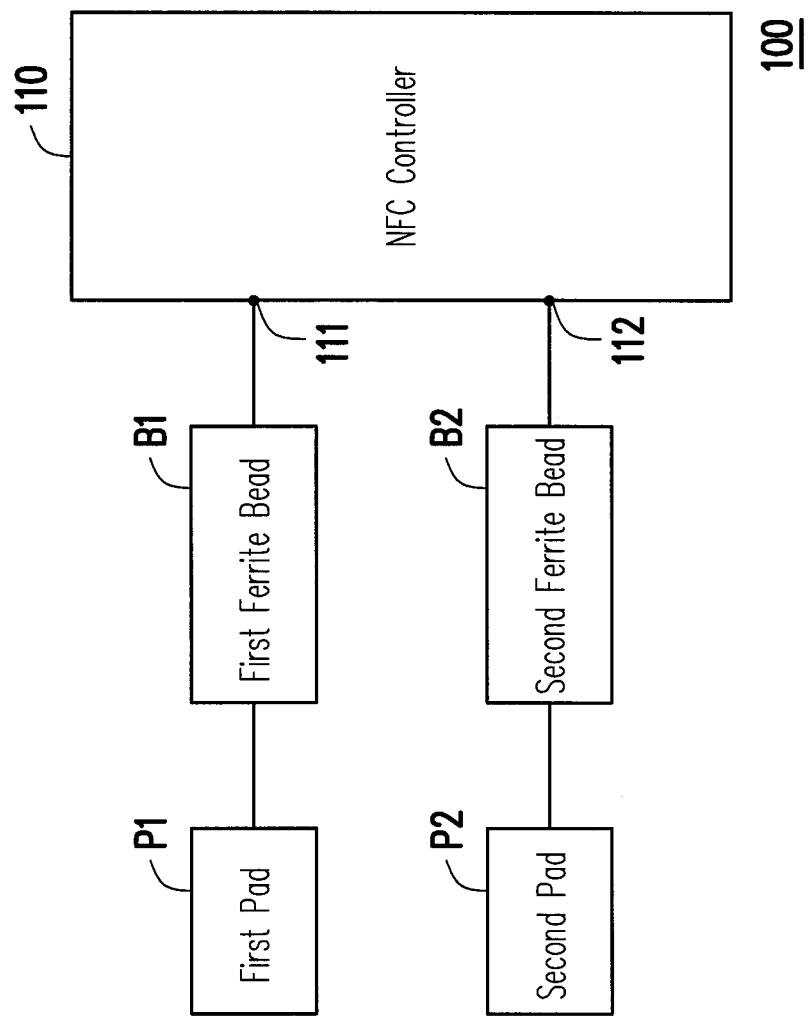
FIG. 1 is a functional block diagram of a NFC circuit according to an embodiment of the present invention.

Referring to the FIG. 1, FIG. 1 is a block diagram of a Near Field Communication (NFC) circuit 100 according to an embodiment of the present invention. The NFC circuit 100 includes a first pad P1, a second pad P2, a first ferrite bead B1, a second ferrite bead B2 and a NFC controller 110. The first ferrite bead B1 and the second ferrite bead B2 are respectively coupled to the first pad P1 and the second pad P2. The NFC controller 110 includes a first pin 111 and a second pin 112 respectively coupled to the first ferrite bead B1 and the second ferrite bead B2.

According to an embodiment of the present invention, the first pad P1 and the second pad P2 may be coupled to the NFC antenna (not shown). A differential NFC signal is outputted by the first pin 111 and the second pin 112, transmitted through the first ferrite bead B1 and the second ferrite bead B2, and the first pad P1 and the second pad P2 in sequence, and thus emitted by the NFC antenna. When the differential NFC signal is transmitted through the first ferrite bead B1 and the second ferrite bead B2, the first ferrite bead B1 and the second ferrite bead B2 allow the fundamental frequency component of the differential NFC signal to pass through them. Besides, the first ferrite bead B1 and the second ferrite bead B2 filter out a plurality of high-frequency components of the differential NFC signal. The frequency of the fundamental frequency component is 13.56 MHz, and each of the high-frequency components mentioned above is a high-frequency harmonic wave of the fundamental frequency component.

Figure 2:
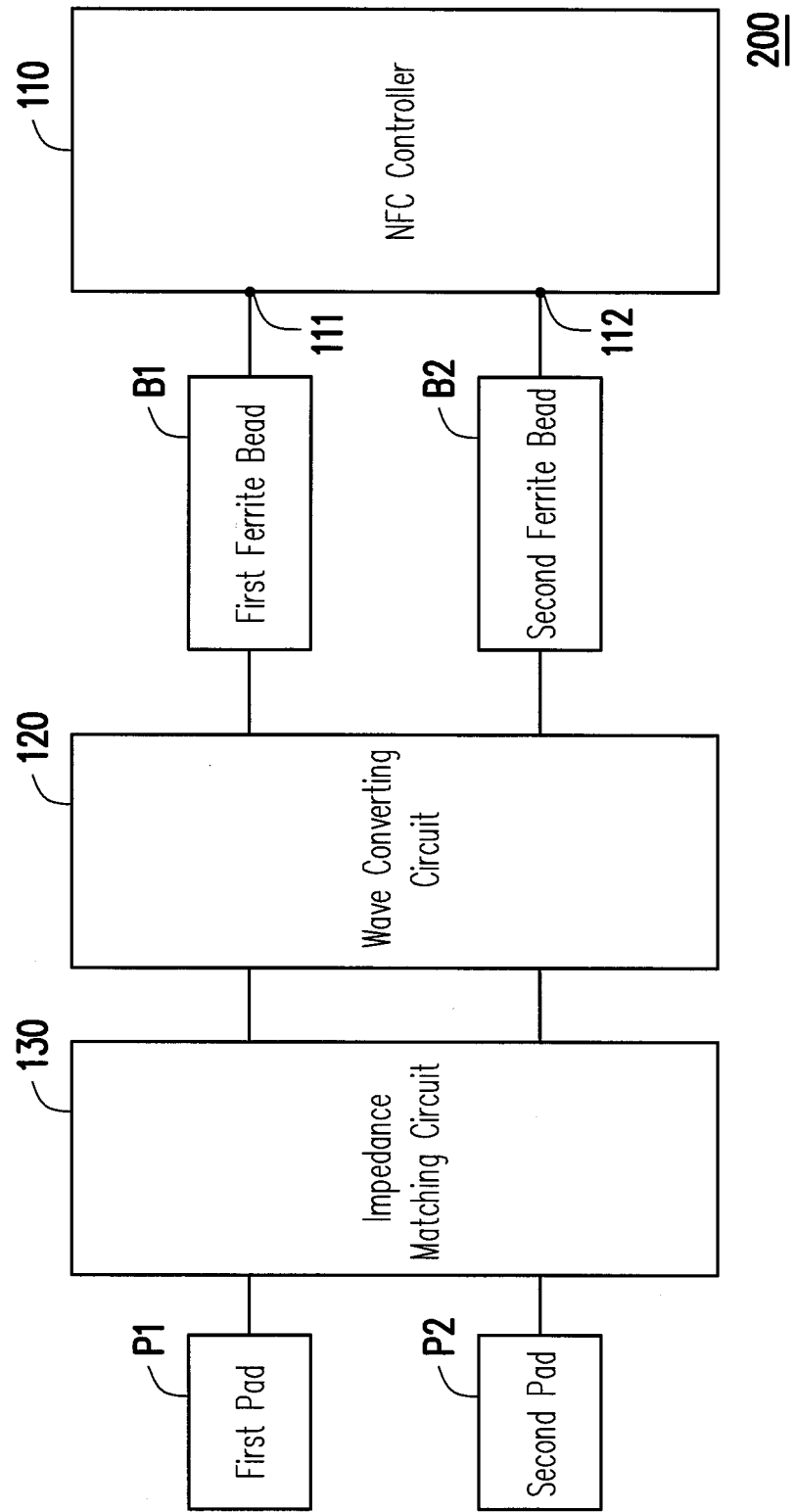
FIG. 2 is a functional block diagram of a NFC circuit according to another embodiment of the present invention.

Referring to the FIG. 2, FIG. 2 is a block diagram of a NFC circuit 200 according to another embodiment of the present invention. The NFC circuit 200 not only includes all the elements of the NFC circuit 100, but also includes a waveform converting circuit 120 and an impedance matching circuit 130. The impedance matching circuit 130 is coupled among the first pin 111, the second pin 112 and the NFC antenna for providing the matched impedance between the NFC controller 110 and the NFC antenna. The waveform converting circuit 120 is coupled among the first pin 111 and the second pin 112 of the NFC controller 110 and the impedance matching circuit 130.

The differential NFC signal outputted by the first pin 111 and the second pin 112 is a square wave with the frequency of 13.56 MHz and can be converted to be the sinusoidal wave by the waveform converting circuit 120. The frequencies of the square wave and the sinusoidal wave are as same as the frequency of the fundamental frequency component of the differential NFC signal. However, the waveform converting circuit 120 can not completely convert the square wave to a sinusoidal wave with a single frequency, i.e. the fundamental frequency (13.56 MHz), so the converted waveform may include several high-frequency harmonic wave components, which can be filtered out by the first ferrite bead B1 and second ferrite bead B2.

According to an embodiment of the present invention, the first ferrite bead B1 may be coupled between the NFC controller 110 and the waveform converting circuit 120, be coupled between the waveform converting circuit 120 and the impedance matching circuit 130 or be coupled between the impedance matching circuit 130 and the first pad P1. Similarly, the second ferrite bead B2 may be coupled between the NFC controller 110 and the waveform converting circuit 120, be coupled between the waveform converting circuit 120 and the impedance matching circuit 130 or be coupled between the impedance matching circuit 130 and the second pad P2. In addition, the relative position between the first ferrite bead B1 and the second ferrite bead B2 can be diverse. For example, when the first ferrite bead B1 is coupled between the NFC controller 110 and the waveform converting circuit 120, the second ferrite bead B2 can be coupled between the waveform converting circuit 120 and the impedance matching circuit 130 or be coupled between the impedance matching circuit 130 and the second pad P2.

Figure 4:
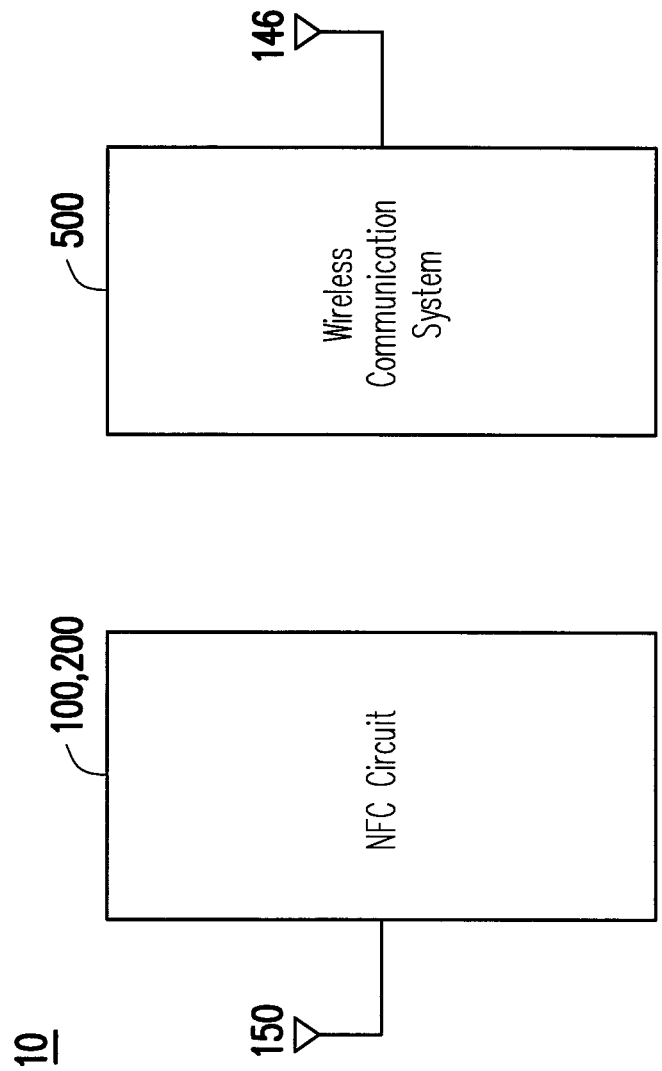
FIG. 4 is a functional block diagram of a communication device according to an embodiment of the present invention.

According to an embodiment of the present invention, the NFC circuit 100 or the NFC circuit 200 may be included in a communication device 10 as illustrated in FIG. 4. The communication device 10 can be a PDA phone or a smartphone, and includes a wireless communication system 500 which can support various standards or protocols such as Global System for Mobile Communications (GSM), Code Division Multiple Access (CDMA), Wideband Code Division Multiple Access (WCDMA) or Long Term Evolution (LTE) but not for limiting thereto. The wireless communication system 500 includes an antenna 146 for transmitting the signal to the base station or receiving the signal from the base station. The NFC circuit (100 or 200) includes an NFC antenna 150 and provides the NFC function to the communication device 10. The NFC function may be a credit card, an electronic wallet, an easy card, a hotel room card or a membership card but not limited thereto. After integrating the NFC circuit (100 or 200) to the communication device 10, the communication device 10 has both the NFC function and the wireless communication function. For example, when the communication device 10 is a smartphone, the NFC circuit (100 or 200) may provide the function as the electronic wallet. Therefore, the user of the communication device 10 can pay the bill by using the NFC function integrated in the communication device 10 without paying the cash. The frequency of the fundamental frequency component of the differential NFC signal is the operating frequency of the NFC function, and the operating frequency of the NFC function is higher than or equal to 13.553 MHz and is lower than or equal to 13.567 MHz, preferably 13.56 MHz. In addition, the wireless communication function described above is provided by the wireless communication system 500 which can be operated under various operating frequencies, and at least one frequency of the high-frequency components of the differential NFC signal is overlapped with one of the operating frequencies operated by the wireless communication system 500. In other words, one of the operating frequencies operated by the wireless communication system 500 is interfered by at least one frequency of the high-frequency components of the differential NFC signal.

Referring to FIG. 1, FIG. 2 and FIG. 4, the first ferrite bead B1 and the second ferrite bead B2 in the NFC circuit (100 or 200) are capable of filtering out the high-frequency harmonic waves of the transmitted differential NFC signal for avoiding the mixture of the high-frequency harmonic wave components and the operating frequency of the wireless communication system 500. Therefore, when the NFC circuit 200 and the wireless communication system 500 are both operated simultaneously, the wireless communication function provided by the wireless communication system 500 is avoided from the interference caused by the NFC function of the NFC circuit 200. Thus, a better communication quality is provided.

For instance, when a wireless communication system 500 is a GSM standard system, the operating frequency is the downlink frequency of the channel 189, which is 881.4 MHz, in the GSM 850 communication standard, and the frequency is equal to the high-frequency harmonic wave which is 65 times of the fundamental frequency component (13.56 MHz, 13.65*65=881.4 MHz). Therefore, when the NFC function is performed by the communication device 10, the high-frequency harmonic wave which is 65 times of the fundamental frequency component is filtered out by the first ferrite bead B1 and the second ferrite bead B2 in order to avoid the operating frequency of the wireless communication function from being interfered by the high-frequency harmonic wave and ensure the transmission quality of the wireless communication function.

For another example, when a wireless communication system 500 is a GSM standard system, the operating frequency is the downlink frequency of the channel 3, which is 935.6 MHz, in the GSM 900 communication standard, and the frequency is equal to the high-frequency harmonic wave which is 69 times of the fundamental frequency component (13.56 MHz, 13.65*69=935.64 MHz). The high-frequency harmonic wave can also be filtered out by the first ferrite bead B1 and the second ferrite bead B2 in order to ensure the transmission quality of the wireless communication function is not interfered.

To ensure the first ferrite bead B1 and the second ferrite bead B2 are capable of allowing the fundamental frequency component to pass completely and filtering out the high-frequency harmonic wave precisely, the selection on the impedance characteristics of the first ferrite bead B1 and the second ferrite bead B2 are very important. According to an embodiment of the present invention, the structures of the first ferrite bead B1 and the second ferrite bead B2 are the same, so the various characteristics such as impedance, rated current, etc. are totally the same. Therefore, only the first ferrite bead B1 will be described in the following description. The second ferrite bead B2 can be selected by referring to the first ferrite bead B1.

For analysis, the impedance Z of the first ferrite bead B1 is equivalent to the formula R+jX (Z=R+jX), where the R is the resistance of the first ferrite bead B1, the X is the reactance of the first ferrite bead B1 and j is the imaginary unit.

Figure 3:
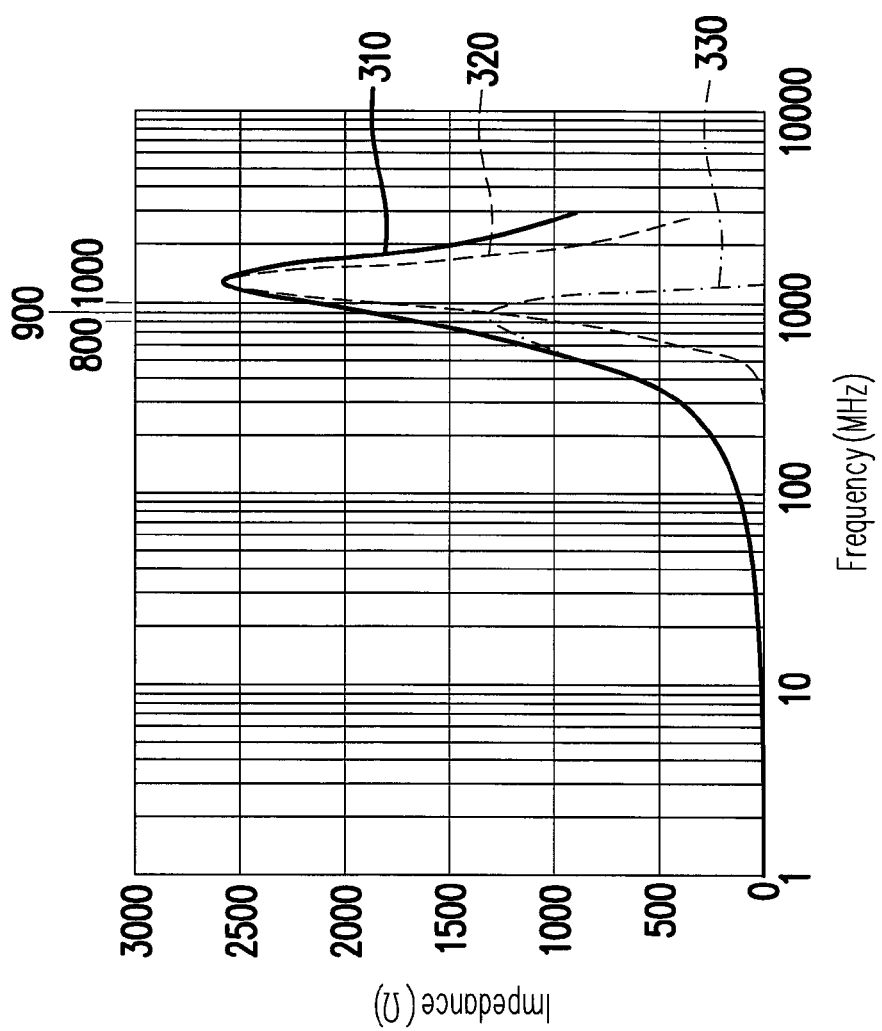
FIG. 3 is a schematic diagram showing the impedance of the first ferrite bead corresponding to the frequency according to an embodiment of the present invention.

Referring to FIG. 3, FIG. 3 is a schematic diagram showing the impedance of the first ferrite bead corresponding to the frequency according to an embodiment of the present invention. The curve 310 in the FIG. 3 is illustrated according to the absolute impedance (Z) values of the first ferrite bead B1 corresponding to various frequency values, the curve 320 in the FIG. 3 is illustrated according to the absolute direct current (DC) resistance (R) values of the first ferrite bead B1 corresponding to various frequency values and the curve 330 in the FIG. 3 is illustrated according to the absolute reactance (X) values of the first ferrite bead B1 corresponding to various frequency values.

Since the operating frequency (fundamental frequency component) of the NFC function provided by the NFC circuit 200 is 13.56 MHz, when selecting the impedance of the first ferrite bead B1, the impedance (Z) value corresponding to the frequency 13.56 MHz should be less than a first threshold T1 and the DC resistance (R) value should be equal to or less than a third threshold T3 acceptable to the NFC controller. As the result, the first ferrite bead B1 allows the fundamental frequency component to pass completely without any degradation and ensures the performance of the NFC function. In contrast, the impedance Z of the first ferrite bead B1 corresponding to each frequency of the high-frequency components (for example, 700~1000 MHz, which is the operating frequency range of the wireless communication in a communication standard) should be greater than a second threshold T2 for filtering out the high-frequency harmonic wave components effectively. Thus, when the NFC function is operated, the high-frequency harmonic wave has no effect on the operating frequency of the wireless communication function, and the performance of the wireless communication function is therefore assured.

Furthermore, the rated currents of the first ferrite bead B1 and the second ferrite bead B2 should be respectively greater than the output currents of the first pin 111 and the second pin 112 to avoid the ferrite beads from being damaged by the condition that the output current of a pin is greater than the rated current of a ferrite bead during the operation of the NFC circuit 200.

In summary, a NFC circuit and a communication device including the NFC circuit are provided. The NFC circuit is capable of filtering out the high-frequency harmonic wave component of the NFC signal by using the ferrite bead and avoiding the operating frequency of the wireless communication system from being interfered by the high-frequency harmonic waves in order to ensure the transmission quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A Near Field Communication (NFC) circuit, comprising:
   a first pad;
   a second pad, wherein the first pad and the second pad are coupled to a Near Field Communication antenna;
   a first ferrite bead, coupled to the first pad;
   a second ferrite bead, coupled to the second pad;
   a Near Field Communication controller comprising a first pin and a second pin respectively coupled to the first ferrite bead and the second ferrite bead, wherein the first pin and the second pin output a differential Near Field Communication signal to be emitted by the Near Field Communication antenna, and the first ferrite bead and the second ferrite bead allow a fundamental frequency component of the differential Near Field Communication signal to pass and filter out a plurality of high-frequency components, which are high-frequency harmonic waves of the fundamental frequency component of the differential Near Field Communication signal, wherein the differential Near Field Communication signal is a square wave;
   an impedance matching circuit, coupled among the first pin, the second pin and the Near Field Communication antenna, for providing a matched impedance between the Near Field Communication controller and the Near Field Communication antenna; and
   a wave converting circuit, coupled among the first pin, the second pin and the impedance matching circuit for converting the differential Near Field Communication signal from the square wave to a sinusoidal wave.

2. The Near Field Communication circuit as claimed in claim 1, wherein a frequency of the fundamental frequency component is an operating frequency of a Near Field Communication function, and the operating frequency is higher than or equal to 13.553 MHz and lower than or equal to 13.567 MHz.

3. The Near Field Communication circuit as claimed in claim 2, wherein the Near Field Communication circuit is used for a communication device including a wireless communication system, and at least one of the frequencies of the high-frequency components is overlapped with an operating frequency of the wireless communication system.

4. The Near Field Communication circuit as claimed in claim 1, wherein structures of the first ferrite bead and the second ferrite bead are the same.

5. The Near Field Communication circuit as claimed in claim 1, wherein an impedance of the first ferrite bead corresponding to the frequency of the fundamental frequency component is smaller than a first threshold, and each of impedances of the first ferrite bead corresponding to each of frequencies of the high-frequency components is greater than a second threshold.

6. The Near Field Communication circuit as claimed in claim 1, wherein a maximum direct current (DC) resistance of the first ferrite bead is smaller than or equal to a third threshold acceptable to the Near Field Communication controller.

7. The Near Field Communication circuit as claimed in claim 1, wherein a rated current of the first ferrite bead is greater than an output current of the first pin, and a rated current of the second ferrite bead is greater than an output current of the second pin.

8. The Near Field Communication circuit as claimed in claim 1, wherein frequencies of the square wave and the sinusoidal wave are as same as the frequency of the fundamental frequency component.

9. A communication device, comprising:
a wireless communication system; and
a Near Field Communication circuit, comprising:
a first pad;
a second pad, wherein the first pad and the second pad are coupled to a Near Field Communication antenna;
a first ferrite bead, coupled to the first pad;
a second ferrite bead, coupled to the second pad;
a Near Field Communication controller including a first pin and a second pin respectively coupled to the first ferrite bead and the second ferrite bead, wherein the first pin and the second pin output a differential Near Field Communication signal to be emitted by the Near Field Communication antenna, and the first ferrite bead and the second ferrite bead allow a fundamental frequency component of the differential Near Field Communication signal to pass, and filter out a plurality of high-frequency components which are high-frequency harmonic waves of the fundamental frequency component of the differential Near Field Communication signal, wherein the differential Near Field Communication signal is a square wave;
an impedance matching circuit, coupled among the first pin, the second pin and the Near Field Communication antenna, for providing a matched impedance between the Near Field Communication controller and the Near Field Communication antenna; and
a wave converting circuit, coupled among the first pin, the second pin and the impedance matching circuit for converting the differential Near Field Communication signal from the square wave to a sinusoidal wave.

10. The communication device as claimed in claim 9, wherein a frequency of the fundamental frequency component is an operating frequency of a Near Field Communication function, and the operating frequency is higher than or equal to 13.553 MHz and smaller than or equal to 13.567 MHz.

11. The communication device as claimed in claim 9, wherein at least one of the frequencies of the high-frequency components is overlapped with one of operating frequencies of the wireless communication system.

12. The communication device as claimed in claim 9, wherein structures of the first ferrite bead and the second ferrite bead are the same.

13. The communication device as claimed in claim 9, wherein an impedance of the first ferrite bead corresponding to the frequency of the fundamental frequency component is smaller than a first threshold, and each of impedances of the first ferrite bead corresponding to each of the frequencies of the high-frequency components is greater than a second threshold.

14. The communication device as claimed in claim 9, wherein a maximum direct current (DC) resistance of the first ferrite bead is smaller than or equal to a third threshold acceptable to the Near Field Communication controller.

15. The communication device as claimed in claim 9, wherein a rated current of the first ferrite bead is greater than an output current of the first pin, and a rated current of the second ferrite bead is greater than an output current of the second pin.

16. The communication device as claimed in claim 9, wherein frequencies of the square wave and the sinusoidal wave are as same as the frequency of the fundamental frequency component.

* * * * *